Sept. 2, 1947.  F. B. HODGDON  2,426,609
DIELECTRIC MATERIALS
Filed Aug. 10, 1943

INVENTOR.
F. B. HODGDON
BY
ATTORNEY

Patented Sept. 2, 1947

2,426,609

UNITED STATES PATENT OFFICE 2,426,609

DIELECTRIC MATERIALS

Frank B. Hodgdon, Naperville, Ill., assignor to Western Electric Company, Incorporated, New York, N. Y., a corporation of New York Application August 10, 1943, Serial No. 498,063

13 Claims. (Cl. 117—16)

This invention relates to dielectric materials and to a method of making the same.

Heretofore, mica and other similar materials have been commonly used as the dielectric body in many types of electrical condensers. However, high quality mica, suitable for use as the dielectric body in electrical condensers, is now difficult to obtain and also, because of its fragility, the preparation of mica to usable form entails considerable work.

In order to provide a dielectric body which will have satisfactory electrical and physical properties, a high dielectric constant material having a suitable low loss characteristic, such as titanium dioxide or various titanates of the alkaline earths may be coated on a suitable film. Ordinarily, the particles of the dielectric material are held together and held to the basic film by a suitable binder. However, the binder, while generally desirable from the point of view of cohesion of the particles and adhesion of the coating to the basic film, may impair the capacity and loss characteristics of the ultimate condenser, it being difficult to find a binder material which will have suitable binder properties as well as suitable dielectric properties. Also, where it is desired to determine the maximum constants of the various materials used in the dielectric body for experimental purposes, the presence of a binder renders it difficult to accurately ascertain the constants.

Objects of the present invention are to provide an effective and efficient dielectric material and a method of making the same.

In accordance with one embodiment of this invention, a polystyrene film may be coated with a thixotropic suspension of a titanate in an alcohol. The coating is partially dried and then calendered to obtain an adherent coating on the film.

Figure 1:
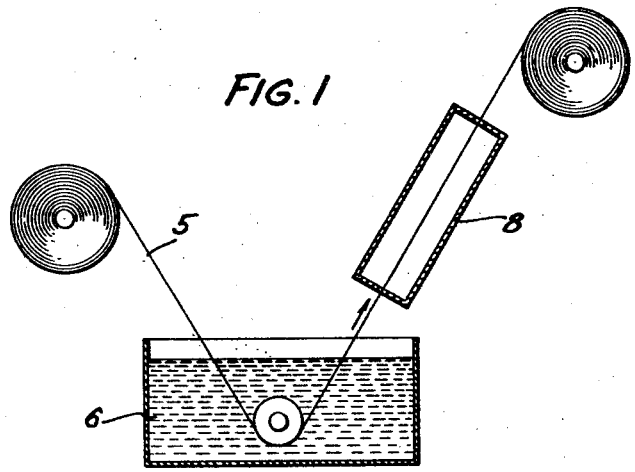
Figure 2:
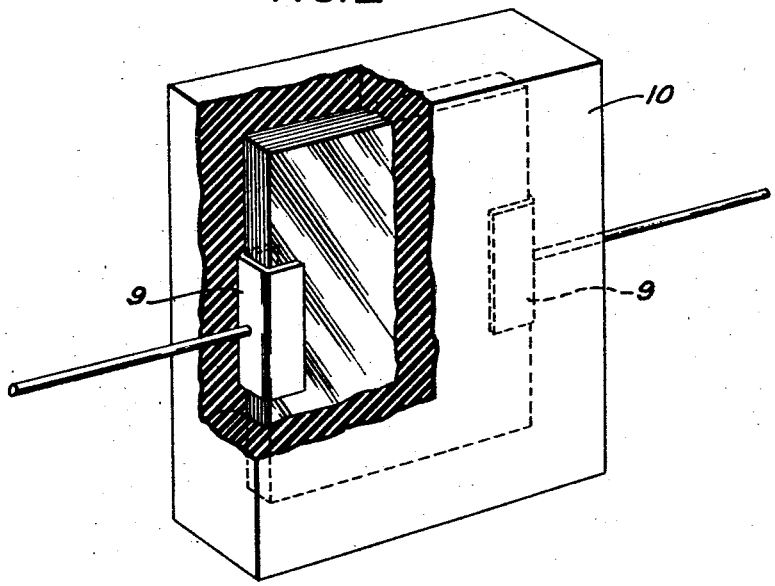

Other objects and advantages of the present invention will be more apparent from the following detailed description taken in conjunction with the drawings, wherein Fig. 1 is a diagrammatic view of a coating apparatus which may be used in practicing this invention; and Fig. 2 is a perspective view, partly in section, of an electrical condenser made in accordance with this invention.

Certain comminuted materials, including titanates of the alkaline earths, form thixotropic suspensions when mixed with a suitable suspending medium. Thixotropy is the property of certain suspensions by reason of which, upon standing, they become gelatinous in form. The gel can be destroyed by simple agitation, and then upon standing again, will reform in the suspension. This property of certain suspensions is used in accordance with this invention in obtaining a pure coating of a dielectric material on a film or foil support.

A thixotropic suspension may be prepared by mixing a quantity of a comminuted ceramic material such as a titanium dioxide, or various titanates of the alkaline earths, which has been previously vitrified and pulverized to obtain a fine ceramic powder, with a quantity of an alcohol, such as ethyl alcohol. A coating composition of satisfactory viscosity is formed by mixing 1000 grams of barium titanate with 750 cc. of ethyl alcohol. The mixing may be carried out in a ball mill and to obtain complete dispersion of the dielectric material requires approximately sixteen to twenty-four hours. Upon standing, a composition prepared in this way will form a gel, that is a thixotropic suspension, which may be coated on a suitable support such as a film of polystyrene or a conducting foil. A wide range of supporting materials may be employed, the primary limitation being that the suspending medium, that is, the alcohol, must wet the surface of the supporting material.

In coating a film of polystyrene, a strip 5 of this material may be passed through a tank 6 containing a thixotropic suspension prepared as hereinbefore described. The slight agitation caused by passing the strip through the tank is sufficient to destroy the gel but, as the strip leaves the bath, the coating becomes a thixotropic suspension which adheres to the strip. Ethyl alcohol evaporates rapidly; consequently, no special step is required to evaporate the alcohol. However, with some materials it may be desirable to expedite the evaporation and, therefore, an oven 8 may be provided through which the strip may be passed after having been coated in the tank 6.

The coated strip is then calendered. Only sufficient alcohol should be evaporated from the coating so that the coating will not adhere to the calendering rolls in the calendering step. If too much alcohol is removed from the coating, on the other hand, the coating will tend to flake off as it passes through the calendering rolls. During the calendering operation, it appears that the particles in the coating are compacted and pressed into the supporting film to form an adherent coating thereover. The calendering rolls may be slightly heated, a range of 95° F. to 125° F. being employed to soften the supporting film. Generally, the more liquid present in the suspension, the cooler must be the calendering rolls in order to prevent the coating from adhering to the rolls. Calendering, in addition to causing the coating to adhere to the supporting film, also improves the uniformity of the coating and reduces the number of open spots, the presence of which tends to impair the quality of the coating as a dielectric material.

After the strip 5 has been coating and calendered, it may be cut into sheets and assembled between sheets of foil to form an electrostatic condenser. A pair of terminal clamps 9, as shown in Fig. 2, may be clamped to either side of the assembly and a housing 10 of insulating material, such as a phenolic condensation product, may then be molded about the assembly. Thereafter, the condenser may be vacuum dried in an oven at approximately 230° F. in a vacuum of approximately .001 mm. of mercury for from sixteen to twenty-four hours to remove all traces of the alcohol or such moisture as may have accumulated during the molding operation.

What is claimed is:

1. A method of making a condenser dielectric comprising coating a film of polystyrene with a thixotropic suspension of an alkali earth titanate in alcohol.

2. A method of making a condenser dielectric comprising coating a film of polystyrene with a thixotropic suspension of an alkali earth titanate in alcohol, and then evaporating the alcohol.

3. A method of making a condenser dielectric comprising coating a thixotropic suspension of an alkali earth titanate in alcohol on a film of polystyrene, drying the coating partially, calendering the partially dried coated film, and then drying the coated film.

4. A method of making a condenser dielectric comprising coating a film of polystyrene with a thixotropic suspension of an alkali earth titanate in alcohol, and then calendering the coated film to cause the coating to adhere to the film.

5. A method of making a condenser dielectric comprising coating a film of polystyrene with a thixotropic suspension of an alkali earth titanate in alcohol, drying the coating to a point at which it will not stick to calendering rolls and yet will not flake off, and then calendering the coated film.

6. A method of making a condenser dielectric which comprises pressing a thixotropic suspension of comminuted particles of an alkali earth titanate into the surface of a film of polystyrene.

7. A dielectric material for a condenser comprising a film of polystyrene having a mass of comminuted particles of an alkali earth titanate embedded in its surface.

8. A method of making a condenser dielectric comprising coating a thixotropic suspension of an alkali earth titanate in alcohol on a film of polystyrene, partially drying the coating, calendering the partially dried coated film at a temperature sufficient to cause the film to soften, and then drying the coated film.

9. A method of making a condenser dielectric comprising coating a thixotropic suspension of an alkali earth titanate in alcohol on a film of polystyrene, partially drying the coating, calendering the partially dried coated film at a temperature on the order of 95° F. to 125° F., and then drying the coated film.

10. A method of making a condenser dielectric comprising coating a film of polystyrene with a thixotropic suspension of an alkali earth titanate in alcohol, and then calendering the coated film at a temperature sufficient to soften the film to cause the coating to be embedded in the film.

11. A method of making a condenser dielectric comprising coating a film of polystyrene with a thixotropic suspension of an alkali earth titanate in alcohol, and then calendering the coated film at a temperature on the order of 95° F. to 125° F. to soften the film to cause the coating to be embedded in the film.

12. A method of making a condenser dielectric comprising coating a film of polystyrene with a thixotropic suspension of an alkali earth titanate in alcohol, drying the coating at a point at which it will not stick to calendering rolls and yet will not flake off, and then calendering the coated film at a temperature sufficient to soften the film.

13. A method of making a condenser dielectric comprising coating a film of polystyrene with a thixotropic suspension of an alkali earth titanate in alcohol, drying the coating to a point at which it will not stick to calendering rolls and yet will not flake off, and then calendering the coated film at a temperature on the order of 95° F. to 125° F. to soften the film.

FRANK B. HODGDON.

REFERENCES CITED

The following references are of record in the file of this patent:

UNITED STATES PATENTS

| Number | Name | Date |
|---|---|---|
| 2,279,762 | Scott | Apr. 14, 1942 |
| 2,177,266 | Schupp | Oct. 24, 1939 |
| 503,424 | Kidwell | Aug. 15, 1893 |
| 2,292,065 | Elsey | Aug. 4, 1942 |
| 1,286,043 | McCulloch | Nov. 26, 1918 |
| 2,104,488 | Kennedy | Jan. 4, 1938 |

FOREIGN PATENTS

| Number | Country | Date |
|---|---|---|
| 834,207 | France | Nov. 16, 1938 |